March 21, 1950  R. H. APELT  2,501,371
ADJUSTABLE SUN VISOR
Filed July 27, 1946

Inventor:
Rudolph H. Apelt,
By Heard Smith & Tennant
Attorneys

Patented Mar. 21, 1950

2,501,371

UNITED STATES PATENT OFFICE 2,501,371

ADJUSTABLE SUN VISOR

Rudolph H. Apelt, Nantasket Beach, Mass.

Application July 27, 1946, Serial No. 686,795

4 Claims. (Cl. 160—239)

This invention relates to an adjustable sun visor, to be associated with a window of a vehicle or the like, having means adapted to be extended downwardly to obscure the rays of light of a setting sun or glare from affecting the eyes of a short occupant of the vehicle.

Usual sun visors comprise a rectangular light-obscuring area of sufficient length to extend across the necessary horizontal field of vision of the observer and are pivotally mounted in such manner as to enable them to be raised out of the line of vision of the occupant of the vehicle and also to be swung laterally in adjusted positions. Such visors, however, are of a fixed width and are not capable of being sufficiently adjusted to obscure the glare of the setting sun when closely approaching the horizon or to prevent glare from affecting the eyes of a short occupant of the vehicle.

The principal object of the present invention is to provide a sun visor having extensible means for increasing the effective vertical width of the visor to any desired extent thereby to protect the eyes of the occupant of the vehicle, particularly the driver, or a short person, from undesirable glare.

Another object of the invention is to provide a sun visor of the character described, of light and inexpensive construction, comprising an adjustable skeleton frame provided with a shade normally covering the area of the frame, but adapted to be extended below the lower edge thereof any desired distance necessary to protect the eyes of the occupant from glare of sunlight.

Another object of the invention is to provide a glareshield having a flexible shade normally covering the frame of the visor but adapted to be extended below the frame with means for retaining the shade in any desired extended position and having means operable to withdraw the shade from such extended position.

A further object of the invention is to provide means for limiting the extension of the shade and for preventing its lower edge from being withdrawn within the area of the frame.

These and other objects and features of the invention will more fully appear from the following description and the accompanying drawing and will be particularly pointed out in the claims.

Figure 1:
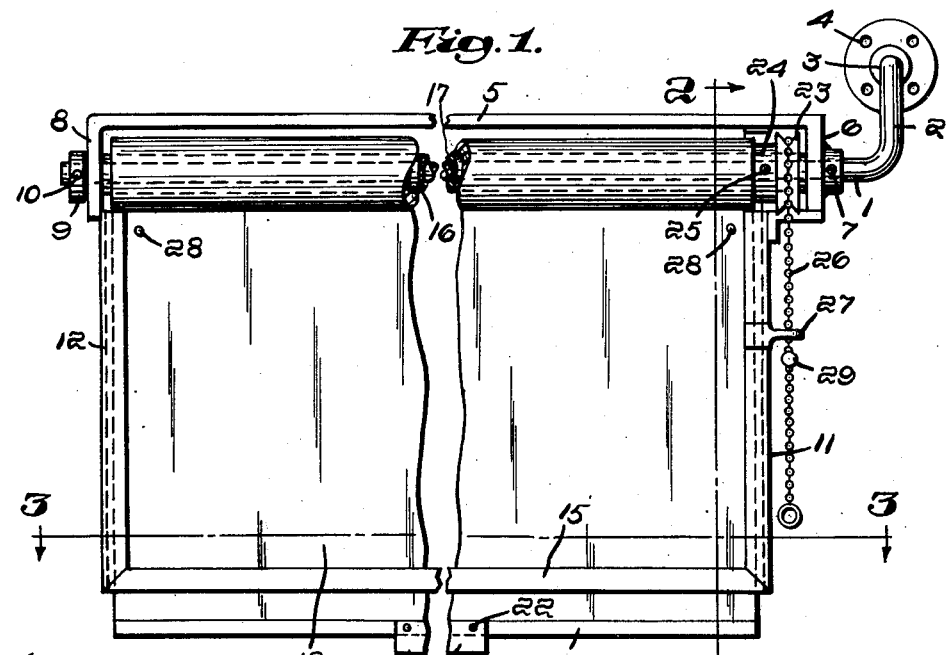
Figure 2:
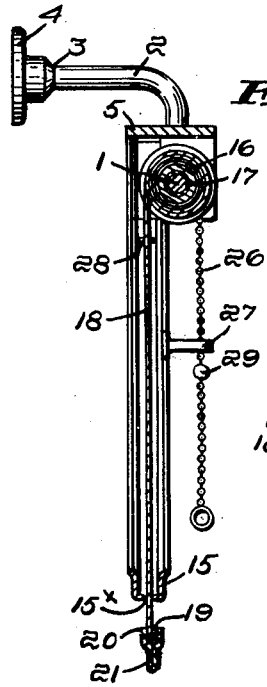
Figure 3:

A preferred embodiment of the invention is illustrated in the accompanying drawing, in which Fig. 1 is a broken front view of an adjustable sun visor embodying the invention;

Fig. 2 is a detail vertical sectional view on line 2—2 Fig. 1, viewed from the left toward the right; and Fig. 3 is a broken detail sectional horizontal view on line 3—3 Fig. 1.

The sun visor embodying the present invention comprises essentially a skeleton frame which is fixedly secured upon an arm having an angularly bent portion which is pivotally connected, preferably by a universal joint, to a suitable bracket adapted to be secured to a portion of the vehicle adjacent to the window thereof, or to the frame of a stationary window through which strong rays of a rising or setting sun or other intense direct or reflected rays of light are likely to impinge upon the eyes of the person sitting within a room in proximity to the window, said frame having a roller journaled therein provided with a shade normally extending across said frame, but adapted to be extended below the lower edge of the frame any desired distance to prevent the glare from affecting the eyes of the person looking through the window.

The preferred construction illustrated in the drawing comprises a horizontal straight cylindrical arm 1 having an angularly offset end 2 which is connected preferably by a universal joint 3 to a bracket 4 adapted to be secured to a support adjacent to the window as in usual glare shield constructions. The skeleton frame comprises a horizontal bar or plate 5 having at one end an integral extension 6 at right angles thereto having a boss rotatably mounted on said arm and fixedly secured to it by a set screw 7 and at the other end a similar integral extension 8 extending from the plate 5. The straight arm 1 is of a length to extend through the extensions 6 and 8 and also through a collar 9 on the outside of the extension 8, which collar has a set screw that can be tightened against the end of the arm 1. This construction is such as to enable the frame to be assembled upon or detached from the arm 1 by loosening the screws 7 and 10 and sliding it lengthwise of the arm 1. End bars 11 and 12 of channel shape and preferably having diverging edges 13 and 14 which are preferably integral with the bar 5 extend at right angles thereto and are connected at their ends by a similar channel-shaped bar 15 having a slot 15x extending longitudinally throughout substantially the full length thereof. A roller 16 is rotatably journaled upon the arm 1 and desirably has interposed between it and the arm 1 a tube or winding 17 of rubber or other suitable frictional material. The roller 16 has secured to it one end of a light-obstructing shade 18 of sufficient width to extend into the channels of the end bars 11 and 12 and of sufficient length to extend through the slot in the bar 15 which connects the end bars 11 and 12. The shade desirably has a hemmed end 19 which contains a stiffening bar 20 and is provided preferably midway of its length with a metallic pull member 21 which embraces the end edge and the bar 20 and is secured to it by suitable rivets 22. The thickness of the hemmed ends of the shade and the pull member 21 is sufficient to prevent the edges of the shade from being withdrawn into the area of the skeleton frame.

By reason of the present construction the pull member 21 of the shade may be grasped and the curtain extended below the bar 15 of the skeleton frame any desired distance and when so extended will be retained in the desired position by the engagement of the frictional material on the roller with the arm 1.

Any suitable means may be provided for rotating the roller in a direction to wind the shade thereon. In the preferred construction a pulley 23 having a hub 24 is fixedly secured to the roller by a set screw 25. A flexible pull member, such as a chain 26, is secured at one end to the pulley 23 and extends downwardly therefrom preferably through a bracket 27 attached to the channel-shaped end 11 of the frame. Suitable means are provided for limiting the extension of the shade beyond a predetermined limit. Such means may comprise studs 28 preferably mounted in the shade adjacent its side edges and adapted to engage the bar 15 when the shade is pulled to fully extended position, or the chain or other pull member may have mounted upon it a stop 29 of larger area than the passage through the bracket 27 adapted when the shade is fully extended to engage the bracket 27, either of these stop members being adapted to prevent the shade from being fully unwound from the roller 16.

By reason of the present invention the visor may be pivotally rotated about its connection to the bracket to any vertical or lateral position when the shade is in normally withdrawn position the visor will operate similar to a usual form of visor. However, if the visor is of insufficient width to interrupt the glare of the setting sun or other light above the horizontal line of vision of the operator the shade may be withdrawn such desired distance as is necessary to cut off the intense rays of light and this is true whether the visor is in vertical position or in inclined position as the weight of the end portion of the shade above described will cause it to depend vertically from the slot in the bar 15 through which it extends.

The present invention therefore provides an adjustable sun visor of universal adaptability. The frame can be readily made of sheet metal or pressed metal parts and together with the roller assembled therein can be applied to the cylindrical horizontal arms of usual sun visor constructions.

It will be understood that the particular embodiment of the invention disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. An adjustable visor to be associated with a window comprising a bracket adapted to be secured to the window frame above and in proximity to a vertical edge of the window pane, a horizontal straight arm connected to said bracket, a rectangular shade-supporting skeleton frame mounted on said arm and having means for guiding the edges of a shade, a roller rotatably journaled on said arm having means frictionally engaging the arm, a flexible light-obstructing shade of greater length than the width of said frame mounted on said roller and extendable well beyond the lower edge of said frame, the edges of the shade being guided by said guiding means, means for retaining the shade in any extended position, and means for rotating the roller to retract the shade from said extended position.

2. An adjustable visor to be associated with a window comprising a bracket adapted to be secured to the window frame above and adjacent to the vertical edge of the window pane, a horizontal straight arm having a right angle extending end portion mounted in said bracket, a long rectangular skeleton shade-supporting frame of relatively narrow width fixedly secured to said arm and normally extending across the necessary field of vision of an observer having means for guiding the side edges of a shade, a roller rotatably journaled on said arm and having means frictionally engaging the same, a flexible light-obstructing shade of greater length than the width of said frame mounted on said roller and having its edges mounted in the guiding means of said frame adapted to be extended well beyond the lower edge of the frame and to be retained in any extended position by the frictional engagement of the roller with said arm, and means for rotating the roller in a reverse direction to retract the shade to any desired distance from extended position.

3. An adjustable visor to be associated with a window of a vehicle comprising a bracket adapted to be mounted on the window frame above and adjacent to a vertical edge of the window pane, a straight horizontal arm extending parallel to the plane of the window pane having a right angle extending end portion mounted in said bracket, a long rectangular shade-supporting skeleton frame of relatively narrow width mounted on said arm and normally extending across the necessary field of vision of the observer, said skeleton frame having parallel channel-shaped ends for guiding the edges of a shade and also having a channel-shaped lower side connecting said ends and provided with a longitudinal slot, a roller rotatably journaled on said arm having frictional means engaging said arm, a flexible light-obstructing shade of considerably greater length than the width of the frame wound upon said roller, the edges of which shade are received in the channel-shaped ends of the skeleton frame, said shade extending through the slot in the lower channel-shaped side of the skeleton frame and adapted to be extended beyond said lower side of the frame, means for limiting the distance to which the shade may be so extended, means for actuating the roller to retract the shade, and means on the lower end of the shade to facilitate the extension thereof, and means to limit the ultimate retraction of the shade.

4. An adjustable visor to be associated with a window of a vehicle comprising a bracket adapted to be mounted on the window frame above and adjacent to a vertical edge of the window pane, a straight horizontal arm extending parallel to the plane of the window pane having a right angle extending end portion mounted in said bracket, a long rectangular shade-supporting skeleton frame of relatively narrow width mounted on said arm and normally extending across the necessary field of vision of the observer, said skeleton frame having parallel channel-shaped ends for guiding the edges of a shade, and also having a channel-shaped lower side connecting said ends and provided with a longitudinal slot, a roller rotatably journaled on said arm having frictional means engaging said arm, a flexible light-obstructing shade of considerably greater length than the width of the frame wound upon said roller, the edges of which shade are received in and guided by said channel-shaped ends of the skeleton frame, said shade extending through the slot in the lower channel-shaped side of the skeleton frame and adapted to be extended beyond said lower side of said frame, means for limiting the distance to which the shade may be so extended, a pulley fixedly secured to one end of said roller having a flexible pull member secured at one end thereto and depending therefrom adapted when pulled to rotate the roller in a direction to wind the shade thereon, and means attached to the end of the shade for preventing the shade being pulled through the slot in the lower side of the frame.

RUDOLPH H. APELT.

REFERENCES CITED

The following references are of record in the file of this patent:

UNITED STATES PATENTS

| Number | Name | Date |
|---|---|---|
| 2,325,923 | Steltner | Aug. 3, 1943 |

FOREIGN PATENTS

| Number | Country | Date |
|---|---|---|
| 554,168 | Great Britain | June 23, 1943 |